United States Patent [19]

Thuries et al.

[11] 4,330,103

[45] May 18, 1982

[54] EARTHQUAKE PROTECTOR

[75] Inventors: Edmond Thuries, Meyzieu; Jean-Paul Sadoulet, Lyons; Denis Dufournet, Villeurbanne, all of France

[73] Assignee: Delle-Alsthom, Villeurbanne, France

[21] Appl. No.: 120,603

[22] Filed: Feb. 12, 1980

[30] Foreign Application Priority Data

Feb. 16, 1979 [FR] France ............................... 79 04010

[51] Int. Cl.[3] ...................... A47B 97/04; F16M 13/00

[52] U.S. Cl. ...................................... 248/548; 52/167; 248/562; 248/636

[58] Field of Search ............... 248/638, 548, 615, 636, 248/603, 562; 52/167

[56] References Cited

U.S. PATENT DOCUMENTS

| | | | |
|---|---|---|---|
| 2,281,955 | 5/1942 | Rosenzweig | 248/615 X |
| 2,312,718 | 3/1943 | Kouyoumjian | 248/638 X |
| 2,597,800 | 5/1952 | Hussman | 248/638 X |
| 2,660,386 | 11/1953 | Munro | 248/638 X |
| 2,950,576 | 8/1960 | Rubenstein | 52/167 X |
| 3,244,393 | 4/1966 | Wallerstein . | |
| 3,730,463 | 5/1973 | Richard | 52/167 X |
| 3,794,277 | 2/1974 | Smedley | 248/548 |
| 4,040,590 | 8/1977 | Baratoff | 52/167 X |
| 4,141,527 | 2/1979 | Wolf | 248/562 |

FOREIGN PATENT DOCUMENTS

| | | | |
|---|---|---|---|
| 872725 | 7/1961 | United Kingdom | 248/562 |

*Primary Examiner*—J. Franklin Foss
*Attorney, Agent, or Firm*—Sughrue, Mion, Zinn, Macpeak & Seas

[57] ABSTRACT

Earthquake protector for protecting apparatus such as a circuit-breaker. The apparatus to be protected is mounted on a support member (2) which is connected to a plate assembly via jack 4. The plate assembly is supported on a base member (8,9) itself firmly connected to a foundation 1 on the ground. The plate assembly comprises a first plate (3) and a second plate (17) which are horizontally movable relative to the base member. The first plate has a first sole plate (5) on its lower surface which engages a second sole plate (7) on the other surface of the base member. Said sole plates are arranged to present a very low coefficient of friction to relative horizontal motion. The second plate (17) is fast with the first plate (3) and is connected therebelow by a connection means (15) passing through corresponding openings in the sole plates (5 and 7). The second plate engages the base member via spring means for opposing relative horizontal motion therebetween and is made fast to the base member by means of a pin (21) of predetermined shear strength such that the pin will break when the base member is subjected to acceleration exceeding a given threshold. The spring means are designed in conjunction with the total moving mass to be protected such that oscillitory frequencies dangerous to the apparatus are poorly transmitted from the ground to the apparatus.

1 Claim, 1 Drawing Figure

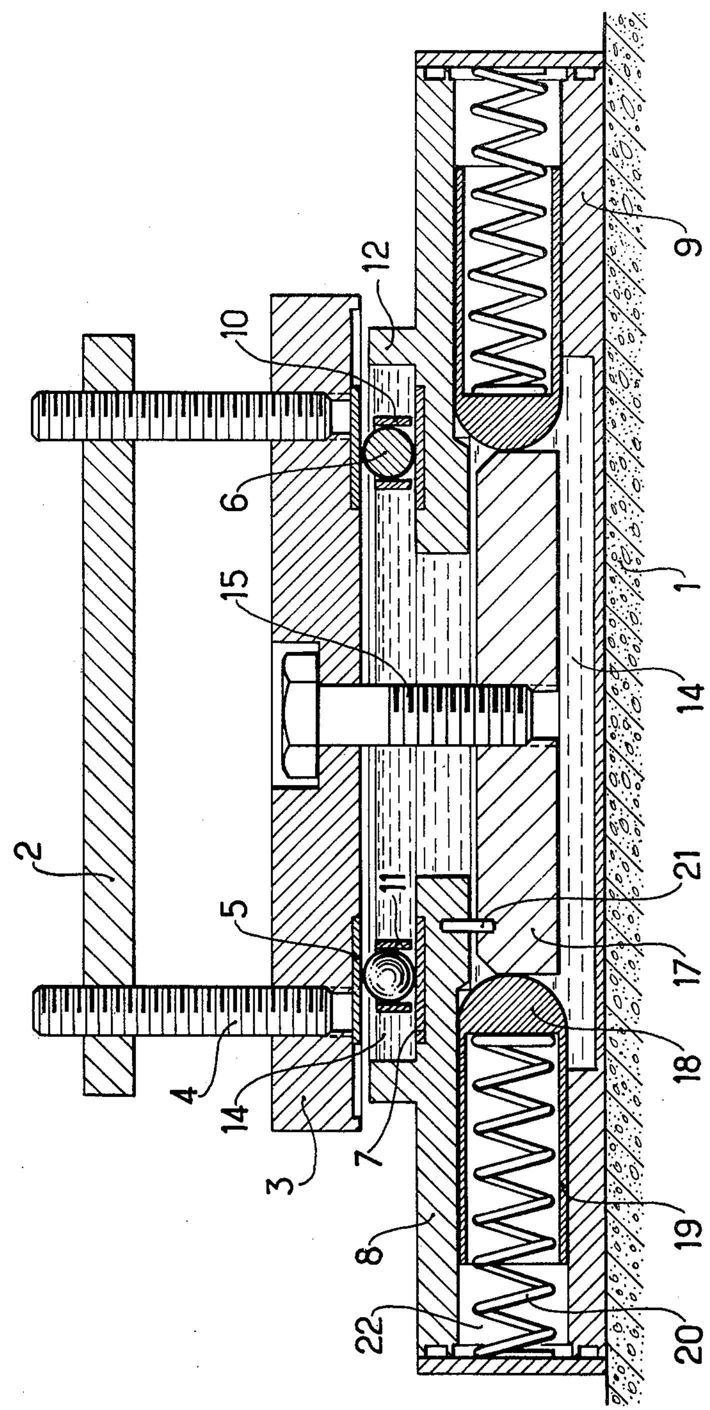
1
2
3
4
5
6
7
8
9
10
11
12
14
14
15
17
18
19
20
21
22

EARTHQUAKE PROTECTOR

FIELD OF THE INVENTION

The present invention relates to an earthquake protector for protecting apparatus such as a circuit-breaker for example.

BACKGROUND OF THE INVENTION

In the particular field of electricity installations, experience has shown that earthquakes can cause much damage, particularly to high tension stations where high power circuit-breakers are employed.

Indeed, such devices generally include heavy moving parts disposed at the top of tall insulators, and are consequently highly vulnerable to earthquakes.

More precisely, it has been observed that during major earthquakes, such devices are subject both to horizontal acceleration and to vertical acceleration. While the vertical accelerations present only a minor danger, the horizontal accelerations tend to damage or even destroy such devices.

The applicant has thus sought to develop a protector suitable for protecting such devices from earthquakes.

When observing the response curve of such an installation to a periodic excitation of variable frequency, it will be observed that for equipment built in accordance with standards laying down conditions for the strength of the materials used, that the greatest accelerations appear for frequencies of about $1\frac{1}{2}$ Hertz, for example, on one particular installation a maximum acceleration of 0.5 g was observed at a frequency of 1.4 Hertz. The acceleration was only 0.2 g at frequencies below 1 Hertz or above 2.8 Hertz.

Taking these observations into account, the protector in accordance with the present invention is interposed between the ground and the apparatus to be protected, and is designed to reduce as much as possible the efficiency with which horizontal stresses are transmitted to the apparatus during an earthquake and to modify the frequency of the oscillation transmitted such that oscillations at the dangerous frequency are attenuated.

SUMMARY OF THE INVENTION

The present invention provides an earthquake protector for protecting apparatus such as a circuit-breaker mounted on at least one support-member, characterised in that the protector comprises a base member for fast connection to a foundation and a plate member comprising first and second plates horizontally moveable relative to the base member, the first plate being connected to the support member by jacks and having a first sole plate on its lower surface, engaging a second sole plate on the upper surface of the base member, said sole plates being arranged to present a very low coefficient of friction to relative horizontal motion, and the second plate being fast with the first plate and connected therebelow by connection means passing through corresponding openings in the sole plates, the second plate engaging the base member via at least one spring for opposing relative horizontal motion therebetween and being made fast therewith by means of a pin of predetermined shear strength such that the pin will break when the base member is subjected to an acceleration exceeding a given threshold.

BRIEF DESCRIPTION OF THE DRAWING

Other characteristics and advantages of the invention will appear from the following description given by way of example with reference to the sole FIGURE of the accompanying drawing which is a vertical section through one embodiment of a protector in accordance with the invention.

DESCRIPTION OF THE PREFERRED EMBODIMENT

A concrete foundation 1 is fixed to the ground. A support member 2 is provided for supporting the apparatus to be protected (not shown); in the present example this apparatus is taken to be a circuit-breaker, but it could alternatively be one column of a multi-column circuit-breaker where each column is supported by its own protector. The support member 2 is connected to a plate 3 via screw-jack 4. On its lower surface the plate 3 has a first annular sole plate 5 made of steel, and bearing on a set of steel bearing balls 6. The balls are arranged on a second annular sole plate 7 analogous to the first sole plate 5. The second sole plate 7 is fixed to a base member 8–9, which itself is fastened to the foundation 1. A plurality of rings, cylinders or cages e.g. 10 and 11 are placed on the second sole plate 7 to limit the sideways motion of the balls 6. The jacks are used to adjust the forces applied to the plate 3 so that the sole plates are permanently pressed against the balls. Further, an annular rim 12 provided on the base member 8–9 delimits a volume 14 containing a damping fluid, e.g. oil.

Further, a second plate 17 is connected to the first plate 3 by bolts such as 15 which pass through the central opening in the annular sole plate. Plates 3 and 17 form a plate assembly. The second plate 17 engages resiliently biassed spherical heads 18 arranged to centre the plate 17. The spherical heads include a trailing cylinder 19 arranged to slide in respective bores 22 in the base member 8–9. Opposing compression springs 20 provide the resilient bias and ensure that the heads 18 remain in contact with the edges of the plate 17, the surfaces which come into contact in this context are arranged to have a high coefficient of friction.

The second plate 17 also engages the base member by a pin 21 having a predetermined shear strength such that it will break when the base member 8,9 is subjected to a horizontal acceleration exceeding a given threshold.

In a variant of the invention, the ball bearings are eliminated and the sole plates 5 and 7 are covered with a layer of substance having a low coefficient of friction e.g. based on polytetrafluoroethylene (PTFE), the sole plates then being in direct contact with each other via their respective coverings.

It is also possible to replace the springs 20 and their cylinders 19 by a helical spring wrapped around the periphery of the second plate 17 to form a torus shape. This spring is then received in a housing in said base member 8–9.

The protector operates as follows:

Suppose that an earthquake moves the foundation 1 and the base member 8,9 horizontally with an acceleration of 0.4 g. The pin 21 breaks immediately since it shear strength is chosen such that it breaks on an acceleration of 0.15 g; this results in the support member and the plate member i.e. the plates 3 and 17, remaining practically stationary during the first instants of the earthquake because of their inertia.

Further, given the low coefficient of friction between the sole plates 5 and 7 (whether supplied by the ball bearing 6 or by coverings of polytetrafluoroethylene) only a small transverse force is transmitted from the base member to the plate 3 and to the support member 2. The damping fluid in the volume 14 also contributes to damping, particularly at high frequencies. Further, the resilience of the springs 20 is predetermined as a function of the mass of the support member 2 and the apparatus supported thereon, in such a manner that the assembly oscillates at a frequency which is substantially less than or greater than the characteristic earthquake frequency from which protection is required.

Also, during an earthquake the second plate 17 prevents the support member 2 from moving dangerously in a vertical direction by coming into contact with the base member 8,9.

After an earthquake, the spring 20 will return the plate member 3,17 to its rest position. Thus there remains only the pin 21 to be replaced.

It can thus be seen that a protector in accordance with the invention very considerably reduces the horizontal stresses due to earthquakes by modifying and damping the oscillation frequencies so that typical frequency-acceleration characteristics for earthquakes no longer correspond to the frequencies at which the protector-apparatus assembly is subjected to the greatest acceleration.

By way of example, it has been observed during tests simulating an earthquake using a vibrating table, oscillations at frequencies at 0.5 and 3 Hz were observed when using the protector in accordance with the invention instead of 1.4 Hz without the protector.

It should also be observed that the protector provides a considerable degree of limitation to vertical motion of the apparatus during an earthquake.

Further, the protector in accordance with the invention avoids any movement of the apparatus to be protected when subjected to ordinary stresses such as those due to wind-loading or to assembly.

The invention is particularly intended for use with outdoor electricity installations such as transformer stations, sub-stations, etc.

Naturally, the invention is in no way limited to the embodiment which has been described and shown in the accompanying drawings by way of example. In particular, the protector may be used for protecting apparatus other than circuit breakers and other than electrical apparatus.

We claim:

1. Earthquake protector for protecting apparatus such as a circuit-breaker mounted on at least one support member positioned on the top of the protector and supporting the apparatus, the improvement wherein the protector comprises a base member positioned at the base of the protector for fast connection to a foundation, a plate assembly positioned between the support member and the base member, said plate assembly comprising first and second plates horizontally movable relative to the base member, said first plate being connected to the support member by jacks and having a first sole plate on its lower surface, a second sole plate on the upper surface of the base member, said first sole plate engaging said second sole plate, means for presenting to the plates a very low coefficient of friction to relative horizontal motion, said second plate being fast with said first plate and connected thereto by connection means passing through corresponding openings in the sole plates, said second plate engaging said base member by at least one spring for opposing relative horizontal motion therebetween and being made fast therewith by means of a pin of predetermined shear strength such that said pin breaks when the base member is subjected to an acceleration exceeding a given threshold, and wherein said sole plate engaging means comprising bearing balls held in place by a cage, thereby providing said very low coefficient of friction, and wherein said at least one spring comprises a helical spring wrapped around its periphery in a torus shape, said torus shaped spring being received in a housing in said base member, and wherein at least said second plate, said sole plates, and said at least one spring are immersed in a bath of damping fluid.

* * * * *